June 6, 1950 A. J. BACHELDER 2,510,306
CAMERA EQUIPPED WITH SHEET-SEVERING
AND TAB-FORMING MECHANISM
Filed Dec. 4, 1947 3 Sheets-Sheet 2

INVENTOR
Albert J. Bachelder
BY Donald L. Brown
Attorney

June 6, 1950 A. J. BACHELDER 2,510,306
CAMERA EQUIPPED WITH SHEET-SEVERING
AND TAB-FORMING MECHANISM
Filed Dec. 4, 1947 3 Sheets-Sheet 3
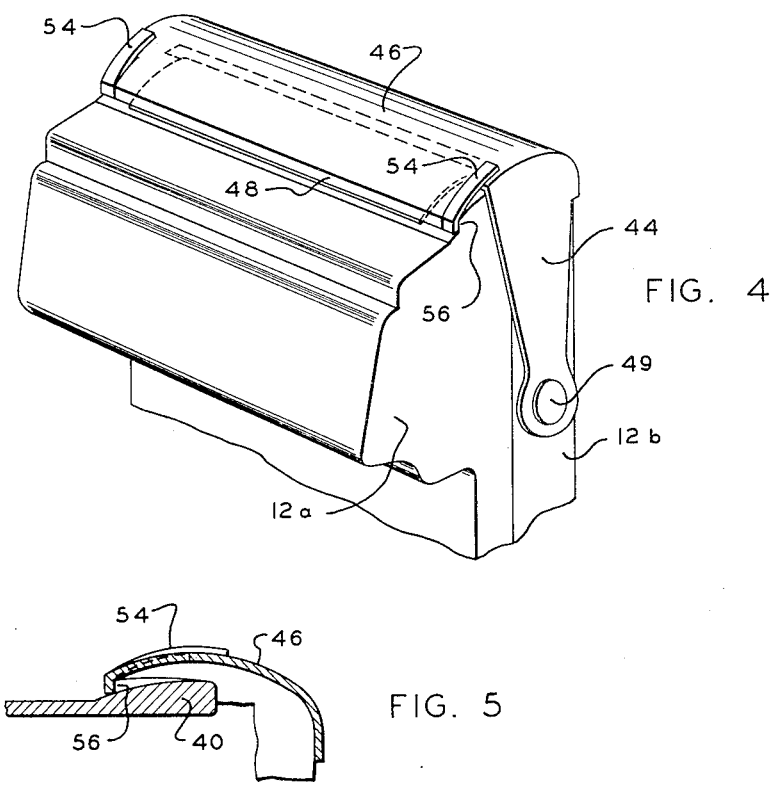
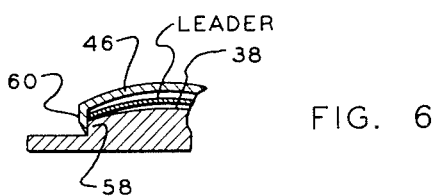

Patented June 6, 1950

2,510,306

UNITED STATES PATENT OFFICE 2,510,306

CAMERA EQUIPPED WITH SHEET-SEVERING AND TAB-FORMING MECHANISM

Albert J. Bachelder, Lexington, Mass., assignor to Polaroid Corporation, Cambridge, Mass., a corporation of Delaware Application December 4, 1947, Serial No. 789,628

7 Claims. (Cl. 95—13)

This invention relates to improvements in photographic apparatus wherein a photosensitive film material is exposed and processed through compression with another sheet material and wherein the materials are withdrawn through an aperture, and more particularly to mechanism employed in such apparatus for predeterminedly holding and severing the materials after their withdrawal.

An object of the invention is to provide a convenient, manually operable mechanism adjacent an aperture in a casing of a photographic apparatus such as a camera for clamping and severing sheet materials which have been drawn through the aperture.

Another object of the invention is to provide mechanism of the character described wherein a tab of the materials is formed for manually withdrawing succeeding portions of the materials through the apparatus to a position exteriorly of the casing.

A further object of the invention is to provide a mechanism of the aforementioned type wherein a means for clamping the materials exteriorly of the casing is also employed to provide a closure for an aperture through which the materials are withdrawn.

Further objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 4 is a fragmentary perspective view similar to Fig. 3 showing a modification of holding elements of the mechanism;

Fig. 5 is a sectional view of the holding elements shown in Fig. 4; and

Fig. 6 is a sectional view of a modification of severing elements of the mechanism.

Mechanism of the invention is adapted to be used in a camera structure of a type wherein movement of a continuous length of film material from a source of supply to exposure position, to processing position and through a slot in the casing to a position exteriorly thereof is to be accomplished preferably by drawing the materials manually through the slot. More particularly, the mechanism is suitable for incorporation with a camera wherein a positive print is formed on or within a layer of material which is compressed with each exposed surface of the film. In such a camera where continuous lengths of sheet materials are employed, it may well be desirable to separate each print-bearing portion of the materials from succeeding portions to provide each print on an individual sheet and to seal the aperture through which the print was withdrawn against the entrance of actinic light. Where said individual prints are thus formed it is essential that at least a tab or leader be provided and that said tab remain extending through the slot after severance of the materials for withdrawing succeeding areas of said materials from the camera. Mechanism of the invention comprises both severing means and tab-forming means of the type required for individually drawing print-bearing portions of the materials through the slot of the camera. Said mechanism also provides a closure for the slot. Suitable materials for use in a camera of the type shown herein comprise a roll of photosensitive film material and a separate roll of another sheet material. After exposure of the film, the materials are brought to face-to-face relationship and subjected to a predetermined compression. When the materials are compressed and caused to be advanced relative to the compressing means, a film-processing fluid, preferably releasably carried by one of the materials, is released and spread between said materials for permeating and processing the film. In the example shown herein spreading of the fluid is accomplished by moving the materials between a pair of compressing members.

Figure 1:
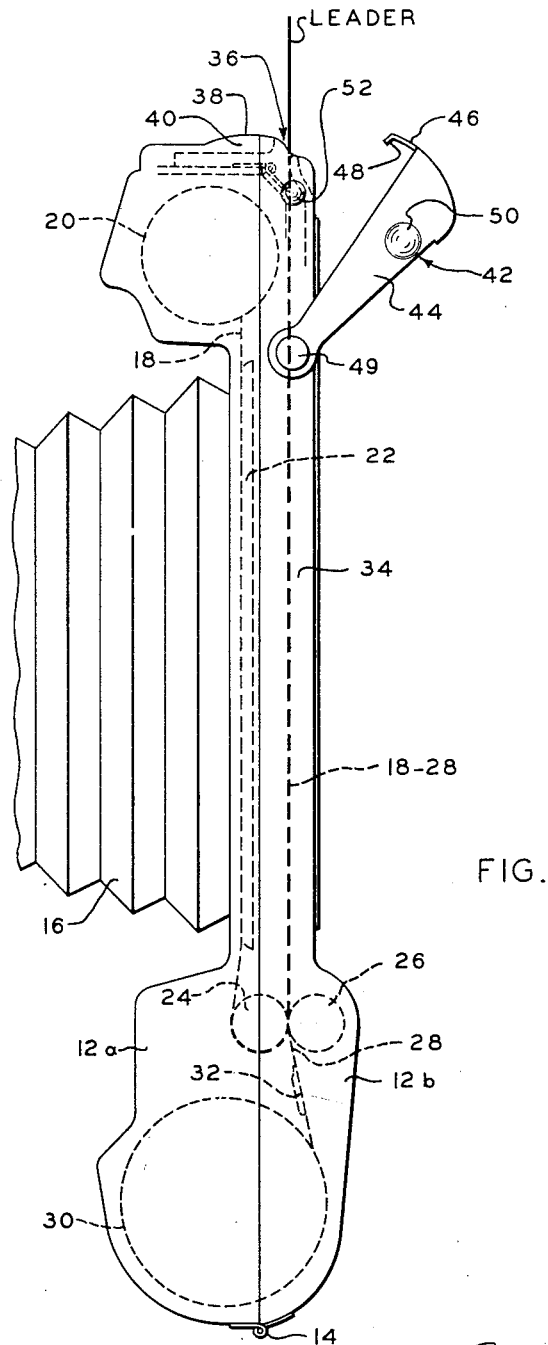
Figure 1 is a diagrammatic view of a camera incorporating mechanism of the invention which shows the relation thereof to a film and another sheet material threaded through the camera.

Referring to Fig. 1 a camera incorporating mechanism of the invention is shown schematically in elevation. The camera comprises casing portions 12a and 12b pivotally mounted with respect to one another by a hinge 14, it being understood that a latch (not shown) is employed for holding said casing portions at closed position. Pivotal mounting of the casing portions permits ready access therewithin for threading the materials used in the camera. A fragment of a bellows 16 is shown attached to casing portion 12a, it being understood that various elements for exposing the film such as lens and shutter means (not shown) are incorporated with the camera.

A photosensitive film material 18 is supplied in the form of a roll 20. The film is positioned across an exposure plane defined by plate 22, and is led around a pressure roller 24, said film being placed between roller 24 and another cooperating pressure roller 26 when casing portions 12a and 12b are at closed position. A sheet material 28, supplied from a roll 30, is provided for the purpose of being compressed with exposed surface areas of film 18. Sheet material 28 preferably carries a plurality of fluid containers 32 mounted in spaced relation to one another upon its surface, each of said containers holding a predetermined quantity of fluid for processing an exposed area of film. Sheet material 28 is superimposed with film material 18 so that when both materials are drawn between and compressed by pressure rollers 24 and 26 the film-processing fluid is released and spread between the materials. After leaving the pressure rollers the compressed materials are drawn through a substantially light-tight chamber 34 and through a slot 36 provided between casing portions 12a and 12b when said casing portions are at closed position.

A surface 38 is provided externally of the camera casing adjacent slot 36 for supporting the materials and forming a tab thereof, said surface, for example, being comprised by a plate member 40 mounted upon an end of casing portion 12a, the surface thereof preferably being convex. Slot 36 is so formed as substantially to exclude light from the compressed film and sheet material in chamber 34. A light-shielding strip (not shown) of a piled fabric or the like may be mounted around one or more of the edges of the slot to provide additional means for excluding light from chamber 34.

A yoke-like element 42, comprising a pair of arms 44 (one arm only being shown) and a transverse preferably concave connecting member 46 having a rim 48 formed along a leading edge thereof, is pivotally mounted upon one of the casing portions as, for example, upon casing portion 12b by a pivot 49. Member 46 provides a closure for slot 36 and said member 46 and rim 48 thereof are adapted to cooperate with one another and with convex surface 38 for predeterminedly treating sheet materials protruding through slot 36. The center points about which the curved surfaces of plate 40 and member 46 are described, are eccentric with respect to one another whereby pivotal movement of yoke-like element 42 causes an edge of connecting member 46 to assume a closer or more remote radial relationship to convex surface 38. Assuming the viewing position of Fig. 1, counterclockwise movement of yoke-like element 42, which produces similar movement of leading portion 48 of member 46 across convex surface 38, provides a concurrent diminishing spacing between said portion 48 and said surface 38. During movement of yoke-like element 42 from the position shown in Fig. 1 to that shown in Fig. 2, a leader of the materials which extends through slot 36 is contacted by rim 48 and is caused thereby to be bent around an edge of the slot in contact with convex surface 38. When said rim 48 has passed a predetermined distance beyond slot 36 and is so spaced from convex surface 38 as to apply a clamping force to the materials, said distance is duplicated by the length of materials underlying member 46.

Figure 2:
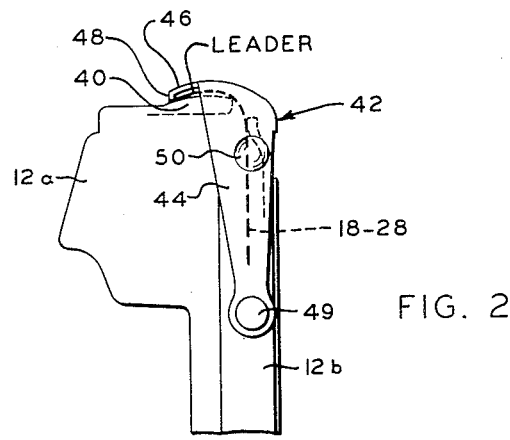
Fig. 2 is a fragmentary view of the camera and mechanism of Fig. 1 wherein the mechanism is shown at a functional position for severing the materials.
Figure 3:
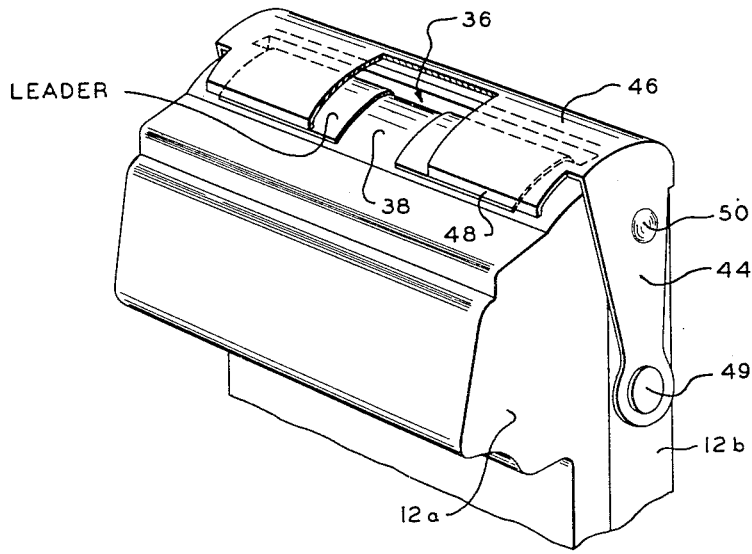
Fig. 3 is a fragmentary perspective view further illustrating the functional position of the mechanism shown in Fig. 2.

The yoke 42 may be manually held at the aforesaid closed clamping position or may be held, wholly or in part, at said position, for example, by the frictional engagement of arms 44 with the sides of the casing and/or by the engagement of surface 38 and rim member 48 with the compressed materials. One form of detent means for holding the yoke 42 at closed position is shown in Figs. 1, 2 and 3 and comprises a concavity 50, formed in each of arms 44, into which a protuberance 52 projecting from casing portion 12b is adapted to be sprung. In Figs. 4 and 5 another form of detent is illustrated comprising a pair of spring-like fingers 54 mounted upon transverse member 46 of the yoke, said fingers being formed for engaging a pair of shoulders 56 provided on plate 40. It will be noted that said fingers are positioned beyond the transverse edges of slot 36 and substantially out of contact with sheet materials extending through said slot, so that said materials cannot interfere with operation of the fingers 54 relative to shoulders 56. When yoke 42 is pivoted to closed position and is held at said position by any of the means aforementioned, a length of the materials bearing the photographic image may be severed by manually drawing or tearing the same against an edge of extending rim member 48, said last-named member having one or more edges suitably formed and sharpened for the purpose.

After severing the material a short leader or tab will be provided underlying the blade-like member 46, as clearly shown in Fig. 3. When yoke 42 is pivoted to open position, said tab may readily be grasped for drawing another photographic frame through the apparatus, upon completion of which, yoke 42 is again closed and the severing and leader-forming operation is repeated for each frame.

In Fig. 6, a modification of the convex surface 38 of plate 40 and of the rim member of blade 46 is shown which provides a mechanism for cutting the materials when yoke 42 is closed. The modification comprises fixed blade 58 which defines a limit of said convex surface 38 and movable blade 60 which supplants the previously-described rim member. It will be understood that the cutter elements shown in Fig. 4 are suitable for employment with yoke 42 and other elements already described and that means for forming a tab for withdrawing succeeding areas of the materials and means providing a closure for slot 36 are included in the modified mechanism.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a camera, mechanism for severing materials treated in said camera and for providing a tab for manually drawing succeeding portions of said materials through the camera, said mechanism comprising means forming a slot in the casing of said camera for removal of said materials, means forming a convex surface on the outside of said casing adjacent said slot for supporting a predetermined area of the materials after said area is withdrawn and bent around the outer edge of the slot, pivotal means comprising a concave surface formed to be moved across and to cooperate with said convex supporting surface for frictionally holding the materials against said convex surface, means for releasably retaining said pivotal means at a position for thus holding said materials, and means associated with said concave and convex surfaces for severing said materials when said surfaces are positioned adjacent one another, the aforesaid convex and concave surfaces being described around center points which are eccentric with respect to one another so that said concave surface is caused to be moved toward and away from said convex surface during movement of said pivotal means.

2. In a camera, mechanism for severing materials treated in said camera and for providing a tab for manually drawing succeeding portions of said materials through the camera, said mechanism comprising means forming a slot in a casing for removal of said materials from said camera, means forming a surface fixed against movement on the outside of said casing adjacent said slot for supporting a predetermined area of the materials after said area is drawn through and bent around an outer edge of the slot, pivotally mounted yoke means comprising a surface capable of being moved arcually across said supporting surface for frictionally holding the materials against said last-named surface, detent means comprising at least a hooked springlike member and a rigid shoulder adapted to cooperate with one another when said yoke means is moved to said position for frictionally holding said materials for retaining said yoke at said position, one of said detent means being associated with said yoke means and the other of said detent means being associated with a fixed surface of said camera adjacent said supporting surface, each of said detent means being spaced transversely from the edges of said supporting surface so as to avoid contact with the edges of said materials, and means providing at least a sharpened surface adjacent an extremity of said movable means for severing the materials when said sharpened surface and said materials are subjected to a force for pressing one against the other.

3. In photographic apparatus wherein photographic sheet materials are processed and from which portions of said sheet materials are successively withdrawn, a casing for said apparatus having a withdrawal passage at one end thereof, a member providing, in cooperation with said casing, for the severance of portions of the sheet materials extending through said passage while leaving a leader of said materials for drawing succeeding portions thereof from the apparatus, said member comprising a sheet-engaging crossbar, a sheet-severing rim integrally formed with said crossbar and extending along one edge thereof at an angle thereto and a pair of arms integrally secured to the ends of said crossbar and depending therefrom, means for pivotally mounting the free ends of said arms on the side walls of said casing at points substantially below said casing end so that said crossbar is movable from an operative position in which it overlaps said casing and covers said passage and in which said sheet-severing rim projects towards said casing end to an inoperative position in which said crossbar is entirely to one side of said casing end, and means for resiliently holding said member in its operative position, said holding means comprising resilient portions on each of said arms and cooperating portions on the sides of said casing, said sheet-engaging crossbar in its operative position holding, between said severing rim and said passage, a length of said sheel material sufficient to provide a leader for withdrawing additional portions thereof from the apparatus.

4. In photographic apparatus wherein photographic sheet materials are processed and from which portions of said sheet materials are successively withdrawn, a casing for said apparatus having a withdrawal passage at one end thereof, a member providing, in cooperation with said casing, for the severance of portions of the sheet materials extending through said passage while leaving a leader of said materials for drawing succeeding portions thereof from the apparatus, said member comprising a sheet-engaging crossbar, a sheet-severing rim secured to said crossbar and extending along one edge thereof at an angle thereto and a pair of arms secured to the ends of said crossbar and depending therefrom, said crossbar being substantially wider than said withdrawal passage so that it can fully cover said passage and project a substantial distance on both sides thereof, means for pivotally mounting the free ends of said arms on the side walls of said casing at points substantially below said casing end so that said crossbar is pivoted from an operative position in which it overlaps said casing and covers said passage and in which said sheet-severing rim projects towards said casing end to an inoperative position in which said crossbar is entirely to one side of said casing end, and means for resiliently holding said member in its operative position, said holding means comprising resilient portions on each of said arms and cooperating portions on the sides of said casing, said sheet-engaging crossbar in operative position holding, between said sheet-severing rim and said passage, a length of said sheet material sufficient to constitute a leader, the pivotal axis for said member being thus so located that said sheet materials may be severed against said sheet-severing rim by a tearing force applied thereto in a substantially radial direction with respect to said axis.

5. In photographic apparatus wherein photographic sheet materials are processed and from which portions of said sheet materials are successively withdrawn, a casing for said apparatus having a withdrawal passage at one end thereof, a member providing, in cooperation with said casing, for the severance of portions of the sheet materials extending through said passage while leaving a leader of said materials for drawing succeeding portions thereof from said apparatus, said member comprising a sheet-engaging crossbar, and a pair of arms secured to the ends of said crossbar and depending therefrom, means for pivotally mounting the free ends of said arms on the side walls of said casing at points substantially below said casing end so that said crossbar is piovatable from an operative position in which it overlaps said casing and covers said passage to an inoperative position in which it is entirely to one side of said casing end, and means for resiliently holding said member in its operative position, said holding means comprising resilient portions on each of said arms and cooperating portions on the sides of said casing, said sheet-engaging crossbar having a sheet-severing edge and in operative position holding, between said edge and said passage, a length of said sheet material sufficient to constitute a leader, the pivotal axis for said member being thus on the opposite side of said sheet material from said crossbar when the latter is in sheet-severing position whereby tearing of said sheet material against said cutting edge may be accomplished by a tearing force applied in a substantially radial direction with respect to said axis.

6. In photographic apparatus wherein photographic sheet materials are processed and from which portions of said sheet materials are successively withdrawn, a casing for said apparatus having a withdrawal passage at one end thereof, a member providing, in cooperation with said casing, for the severance of portions of the sheet materials extending through said passage while leaving a leader of said materials for drawing succeeding portions thereof from the apparatus, said member comprising a sheet-engaging crossbar and a pair of arms secured thereto, means for pivotally mounting said arms on opposite sides of said casing at points spaced substantially below said casing end so that said crossbar is pivotable from an operative position in which it overlaps said casing end and covers said passage to an inoperative position in which it is entirely to one side of said casing end, and means for resiliently holding said member in its operative position, said sheet-engaging crossbar having a sheet-severing edge and in operative position holding, between said edge and said passage, a length of said sheet material sufficient to constitute a leader, the pivotal axis for said member being thus on the opposite side of said sheet material from said crossbar when the latter is in sheet-severing position whereby tearing of said sheet material against said cutting edge may be accomplished by a tearing force applied in a substantially radial direction with respect to said axis.

7. In photographic apparatus wherein photographic sheet materials are processed and from which portions of said sheet materials are successively withdrawn, a casing for said apparatus having a withdrawal passage at one end thereof, a member providing in cooperation with said casing, for the severance of portions of the sheet materials extending through said passage while leaving a leader of said materials for drawing succeeding portions thereof from the apparatus, said member comprising a sheet-engaging crossbar and a pair of arms secured thereto, means for pivotally mounting said arms on opposite sides of said casing at points substantially below said casing end so that said crossbar is pivotable from an operative position in which it overlaps said casing end and covers said passage to an inoperative position in which it is entirely to one side of said casing end, and means including an element on one side of said casing and a cooperating element on one of said arms for resiliently holding said member in its operative position, said sheet-engaging crossbar having a sheet-severing edge and in operative position holding, between said edge and said passage, a length of said sheet material sufficient to constitute a leader, the pivotal axis for said member being thus on the opposite side of said sheet material from said crossbar when the latter is in sheet-severing position whereby tearing of said sheet material against said cutting edge may be accomplished by a tearing force applied in a substantially radial direction with respect to said axis.

ALBERT J. BACHELDER.

REFERENCES CITED

The following references are of record in the file of this patent:

UNITED STATES PATENTS

| Number | Name | Date |
| --- | --- | --- |
| 1,424,816 | Grillone | Aug. 8, 1922 |
| 1,497,260 | Edil | June 10, 1924 |
| 2,095,849 | Wittel | Oct. 12, 1937 |